United States Patent [19]

Rohrer

[11] 4,305,491

[45] Dec. 15, 1981

[54] REMOTE SENSING FAN DRIVE

[75] Inventor: Douglas D. Rohrer, Marshall, Mich.

[73] Assignee: Eaton Corporation, Cleveland, Ohio

[21] Appl. No.: 130,690

[22] Filed: Mar. 17, 1980

[51] Int. Cl.³ .................... F16D 35/00; F16D 43/25
[52] U.S. Cl. ............................. 192/58 B; 123/41.12;
192/82 T; 192/96; 251/129
[58] Field of Search .................. 192/58 B, 82 T, 96;
123/41.12; 251/129

[56] References Cited

U.S. PATENT DOCUMENTS

| 2,687,789 | 8/1954 | Nardone | 192/96 X |
|---|---|---|---|
| 3,568,647 | 3/1971 | Adams | 192/82 T X |
| 3,985,333 | 10/1976 | Paulsen | 251/129 |
| 4,228,880 | 10/1980 | Gee | 192/82 T X |

Primary Examiner—Allan D. Herrmann
Attorney, Agent, or Firm—R. J. McCloskey; M. L. Union; J. Yakimow

[57] ABSTRACT

A viscous fluid clutch (10) rotatable about an axis of rotation (24) and adapted to be controlled by a temperature sensing element (104). The fluid clutch includes an axially extending shaft (22) disposed on the axis of rotation, a first member (14) secured to the shaft for rotation and a second member (16) rotatably disposed on the shaft relative to the first member. Shear surfaces (62, 64) are disposed on the first and second members and form an operating chamber (18) therebetween. A fluid storage chamber (70) is disposed adjacent to the operating chamber and valve means (80) is provided for effecting selective communication between the storage chamber and the operating chamber and includes a valve member (82) having first and second positions, one of which provides fluid communication between the storage chamber and the operating chamber and the other which blocks the fluid communication. A fluid is disposed within the storage chamber and is selectively displaceable into the operating chamber. An electromagnetic coil (88) having an axial opening therein defined by a surface of the coil is located within the shaft and an armature member (84) having an outer surface is located at least partially within the axial opening with the outer surface of the armature member disposed contiguous to the inner surface of the coil. The armature member is movable in an axial direction upon energization of the coil and is operatively connected to the valve member to effect movement of the valve member.

17 Claims, 4 Drawing Figures

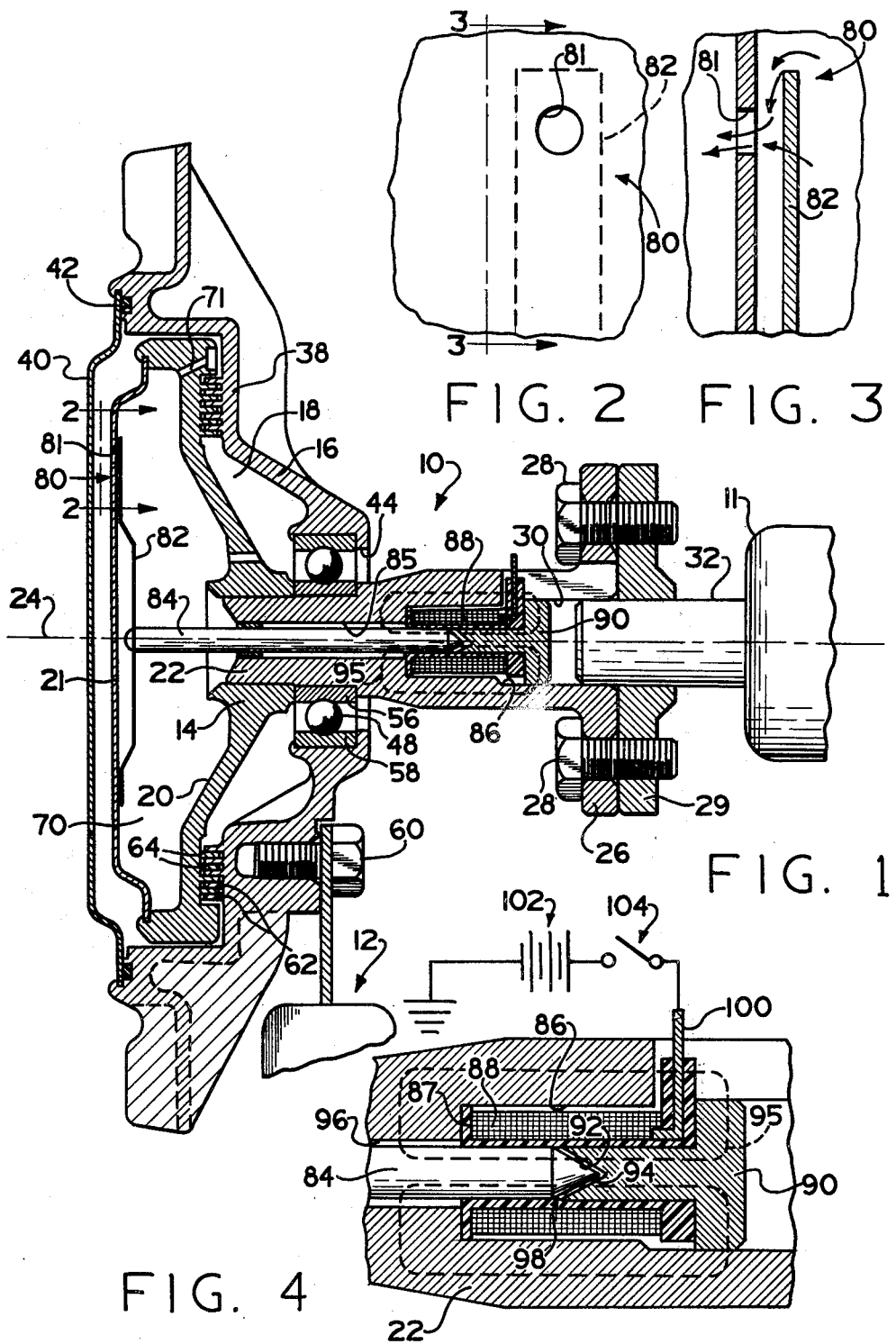

4,305,491

1

REMOTE SENSING FAN DRIVE

BACKGROUND OF THE DISCLOSURE

The present invention relates to a viscous fluid clutch and more particularly to a viscous clutch adapted to be controlled by a remote temperature sensing element wherein an electromagnetic coil is disposed within a cavity in the shaft of the fluid clutch and an armature member is disposed within the coil and moves in response to energization of the coil. Movement of the armature member controls the fluid flow in the viscous coupling between the reservoir and the operating chamber. The armature and coil are arranged to optimize the flux path which effects movement of the armature to enable the clutch to utilize a small low power coil to effect movement of the armature.

Known remote sensing viscous fluid clutches have not optimized the flux circuit between an electromagnetic coil and an armature moved in response to the electromagnetic coil. The known prior art, such as disclosed in the Detty, U.S. Pat. No. 4,056,178, utilize a coil to control the fill and scavenge rates of a viscous clutch wherein the coil is disposed around the circumference of the shaft of the water pump. The coil surrounds the shaft and an armature member is disposed coaxially to the shaft in an axial opening in the shaft and moves in response to energization of the coil. The armature member is not located within the coil and the flux path established by the coil is required to pass through much of the magnetic material of the water pump and through a substantial portion of the shaft as well as a large air gap in order to create a magnetic field to effect movement of the armature. Such a flux path requires large amounts of energy to effect movement of the armature due to the losses occurred when the flux path passes through portions of the water pump, shaft and air gap. Such a configuration requires a larger coil which consumes more power than that described in the present application.

SUMMARY OF THE INVENTION

The present invention relates to a new and improved viscous fluid clutch wherein an optimized magnetic circuit is provided between an electromagnetic coil disposed in the shaft of the fluid clutch and the armature which is coaxially disposed in the shaft within the electromagnetic coil.

The present invention further provides a new and novel fluid clutch which is rotatable about an axis of rotation and adapted to be controlled by a remote sensing element wherein the clutch includes an axially extending shaft, a first member secured to the shaft for rotation therewith, a second member rotatably disposed on the shaft relative to the first member, shear surfaces disposed on the first and second members and forming an operating chamber therebetween, a fluid storage chamber disposed adjacent to the operating chamber and valve means for effecting selective communication between the storage chamber and the operating chamber and including a valve member having first and second positions, one of which provides for fluid communication between the storage chamber and the operating chamber and the other of said positions which blocks the fluid communication. A fluid means is disposed within the storage chamber and is selectively displaceable into the operating chamber to provide a medium to transmit rotational movement from one of the members to the other of the members. A pump is disposed in the operating chamber to displace the fluid from the operating chamber to the storage chamber. An electromagnetic coil is provided which has an axial opening therein defined by an inner surface of the coil. An armature member is provided having an outer surface which is located at least partially within the axial opening of the coil with the outer surface of the armature member being disposed contiguous to the inner surface of the coil. The armature member is movable in an axial direction upon energization of the coil and is operatively connected to the valve member to effect movement of the valve member between the first and second positions.

A further provision of the present invention is to provide a new and improved viscous fluid clutch as set forth in the preceding paragraph wherein the coil establishes a flux field to move the armature in an axial direction which sequentially passes from the coil to the armature and back to the coil without passing through a substantial portion of the shaft or a significant air gap.

Another provision of the present invention is the provision of a new and improved viscous clutch adapted to be controlled by a sensing element spaced apart from the fluid clutch including an axial extending shaft, a first member secured to the shaft for rotation, a second member rotatably disposed on the shaft relative to the first member, shear surfaces disposed on the first and second members and forming an operating chamber therebetween, a fluid storage chamber disposed adjacent the operating chamber, valve means effecting selective communication between the storage chamber and the operating chamber and including a valve member having first and second positions, one of which provides for fluid communication between the storage chamber and the operating chamber and the other of said positions blocking such fluid communication, fluid means disposed within the storage chamber and selectively displaceable into the operating chamber to provide a medium to transmit rotational movement from one of the members to the other of the members and pump means in the operating chamber to displace the fluid means from the operating chamber to the storage chamber. The shaft includes a cavity disposed therein and an electromagnetic coil is located within the cavity and has an axial opening therein defined by an inner surface of the coil. An armature member is provided having an outer surface located at least partially within the axial opening with the armature member being movable in an axial direction upon energization of the coil which establishes a flux field whih sequentially passes from the coil, to the armature, and then back to the coil. The armature member is operatively connected to the valve member to effect movement of the valve member between the first and second positions in response to energization of the coil.

A still further provision of the present invention is to provide a new and improved cooling system for an internal combustion engine including a fan and a viscous fluid clutch for driving the fan, including an axial extending shaft, a first member secured to the shaft for rotation, a second member rotatably disposed on the shaft relative to the first member, shear surfaces disposed on the first and second members and forming an operating chamber therebetween, a fluid storage chamber disposed adjacent the operating chamber, valve means for effecting selective communication between the storage chamber and the operatinng chamber including a valve member having first and second positions, one of which provides for fluid communication between the storage chamber and the operating chamber and the other of the positions blocking such fluid communication, fluid means disposed within the storage chamber and selectively displaceable into the operating chamber when the valve member is in one of the positions to provide a medium to transit rotational movement from one of the members to the other of the members and pump means in the operating chamber to displace the fluid means from the operating chamber to the storage chamber. The cooling system further includes a water pump connected to the shaft of the viscous fan drive for driving the shaft and the first member and an electromagnetic coil having an axial opening therein defined by an inner surface of the coil. An armature member having an outer surface is located at least partially within the axial opening of the coil with the outer surface of the armature member being disposed contiguous to the inner surface of the coil. The armature member is movable in an axial direction upon energization of the coil and is operably connected to the valve member to effect movement of the valve member between the first and second positions in response to the energization of the coil.

A further provision of the present invention is to provide a new and improved cooling system for an internal combustion engine as set forth in the preceding paragraph wherein the shaft includes a cavity and the coil is located in the cavity of the shaft to optimize the flux path established between the coil and armature member when the coil is energized.

DESCRIPTION OF THE DRAWINGS

FIG. 1 is a schematic crosssectional illustration of the viscous fluid clutch of the present invention and includes a schematic fragmentary illustration of a portion of the water pump which supports the viscous fluid clutch.

FIG. 2 is a fragmentary illustration taken approximately along the line 2—2 of FIG. 1 more fully illustrating the valve member for providing selective fluid communication between the operating chamber and the reservoir.

FIG. 3 is a schematic illustration taken approximately along the lines 3—3 of FIG. 2 illustrating a side view of the valve member when it is in an open condition.

FIG. 4 is an enlarged fragmentary view more fully illustrating the coil and armature member.

DESCRIPTION OF THE PREFERRED EMBODIMENT

The present invention provides a reliable fluid coupling having relatively rotatable input and output coupling members in which a fluid shear medium between the coupling members transmits torque from the input coupling member to the output coupling member when the input coupling member is driven. The transmission of torque can be through a viscous shear or hydromechanical coupling of a fluid medium in an operating chamber. The fluid coupling embodying the present invention is suitable to couple various driving units to units to be driven thereby and is particularly suitable for coupling a vehicle motor or a member driven therefrom to various accessories therefor such as the water pump, radiator fan, etc.. Accordingly, the various fluid coupling embodiments, representing preferred embodiments of the invention, will be described as driving vehicle accessories, more particularly, the radiator fan.

As representing one preferred embodiment of the invention, a fluid coupling 10 is disclosed in FIGS. 1–4 for driving a fan 12 from a water pump 11, of a vehicle. The water pump 11 is driven in by the engine (not illustrated) of the vehicle in a well kbown manner. The fluid coupling 10 includes relatively rotatable input and output members 14 and 16, respectively. Input coupling member 14 is driven from the water pump 11 and when so driven, rotates in a working chamber 18 defined between the input and output coupling members 14, 16. The input clutch member 14 comprises a radially extending portion 20 and a hub or shaft portion 22 which is located concentric to the axis of rotation 24 of the unit 10. The hub or shaft portion 22 extends axially and is press fitted or connected in a suitable fashion to the radially extending portion 20 for rotation therewith.

The hub 22 includes a flange portion 26. The flange 26 is operably connected by the bolts 28 to the flange 29 of the water pump 11. The flange 26 includes an axially extending opening 30 which is adapted to receive the water pump shaft 32 therein. The flange 26 provides a mounting assembly to mount the torque transmitting coupling 10 to the water pump 11 of the vehicle and the axial opening 30 cooperates with the shaft 32 of the water pump 11 to center the flange 26 coaxial to the axis of rotation 24 of the water pump shaft 32 and the unit 10. Rotation of the flange 26 with the output shaft 32 of the water pump 11 will cause the axially extending hub portion 22 and the radially extending portion 20 of the input member 14 to rotate therewith.

Rotation of the input coupling member 14 transmits torque to the relatively rotatable output member 16 through a fluid shear medium, such as silicone fluid. The output coupling member 16 comprises a disc-shaped plate member 38 and a plate-like cover member 40 which may have a plurality of cooling fins, not illustrated thereon. The cover member 40 and disc-shaped member 38 are joined at their peripheries by any suitable connector means and are sealed by a seal 42 to prevent leakage. The output member 14 cooperates with the input member 16 to form the working chamber 18 within which the silicon fluid is disposed. The plate member 38 includes an annular opening 44 at its central portion through which the axially extending hub 22 extends. A suitable bearing 48 is disposed between the opening 44 and the outer surface of hub portion 22 to provide for relative rotation between the hub portion 22 and the output member 16. The bearing 48 includes an inner bearing race 56 which is secured to the hub portion 22 of the input member 14 for rotation therewith and an outer race 58 which is secured to the output member 16 for rotation therewith. The bearing 48 provides for relative rotation of the input coupling member 14 and the output coupling member 16.

A fan blade assembly 12 is secured by the bolts 60 to the member 38 for rotation therewith. The fan blades 12 will operate to draw air to the radiator of the vehicle in a well known manner upon rotation of the output coupling member 16.

The member 38 of driven coupling member 16 includes a plurality of concentric annular coupling lands 62 which are disposed in the operating chamber 18. The radially extending portion 20 of the driving coupling member 14 also includes a plurality of annular concentric coupling lands 64. The annular lands 64 are positioned in an axially overlapping relationship with the annular coupling lands 62 of the driven clutch member 16 so that the grooves disposed between the lands of one of the members receives the lands of the other member and vice versa, to form the fluid operating chamber disposed between the lands. The aforementioned coupling grooves 62, 64 are disposed in position so that when oil or other viscous fluid means, such as silicon oil, is disposed between the lands 62, 64 torque can be transmitted from the input coupling member to the output coupling member by either viscous shear or hydromechanical coupling. The volume of fluid in the coupling chamber 18 controls the degree of coupling and relative rotation between the input member 14 and the output member 16. The operation of the alternating lands and grooves to couple the input member 14 and output member 16 is more fully disclosed in U.S. Pat. No. 3,055,473, which is incorporated herein by reference.

A well known pump member, not illustrated, is connected to the output member 16 for rotation therewith. The construction of the pump member is well known and more fully disclosed in U.S. Pat. No. 3,055,473, which is incorporated herein by reference. The pump member is secured to a peripheral portion of the disc-shaped member 38 and provides for fluid flow from the operating chamber 18 to a fluid reservoir 70 which is defined between the radially extending portion 20 of the input member and a disc-shaped cover portion 21 which is secured to the radially extending portion 20 of the input member 14 for rotation therewith. A suitable fluid passageway schematically illustrated at 71 is disposed in the radially extending portion 20 of the input member 14 to provide for fluid communication from the operating chamber 18 to the fluid reservoir 70. The pump member rotates with the output member 16 to pump fluid in a well known manner, from the operating chamber 18, through the fluid passageway 71 to the reservoir 70.

A valve means 80 is provided to control fluid flow from the reservoir 70 to the operating chamber 18. The valve means 80 includes a valve opening 81 and a valve member 82 which is more fully disclosed in FIGS. 2 and 3. The valve member 82 is disposed on a valve shaft 84 for movement in an axial direction parallel to the axis of rotation 24. The valve member 82 is movable from a position in which it blocks the fluid flow through the valve opening 81 to a position in which the valve member 82 is spaced apart from the valve opening 81 to allow fluid to flow from the reservoir 70 to the operating chamber 18 as is illustrated in FIG. 3. The valve member 82 is adapted to be positioned to cover and uncover the valve opening 81 to selectively control fluid flow from the reservoir 70 to the operating chamber 18. Movement of the valve shaft 84 positions the valve member 82 relative to the valve opening 81 to control the flow therethrough. The function of valve member 82, which is to open and close valve opening 81 to thereby control the fluid flow from the reservoir 70 to the operating chamber 18 and have the volume of fluid in operating chamber 18 and the coupling between the input member 14 and the output member 16, is well known in the art and is more fully described in U.S. Pat. No. 3,055,473 which is incorporated herein by reference.

The valve shaft 84 is disposed coaxial to the axis of rotation 24 and is located within a coaxial opening 85 disposed in the shaft 22. A suitable lining or bushing 87 may be provided in the opening 85 in coil 88 to provide for and guide movement of the valve shaft or armature 84. The valve shaft 84 is adapted to move in a direction parallel to the axis of rotation 24 to move the valve member 82 from a first position in which it blocks opening 81 to a second position in which it is spaced apart from the opening 81 and allows fluid flow therethrough. A cavity 86 is located in the shaft member 22. The cavity 86 is a cylindrical cavity disposed coaxial to the axis of rotation 24 and includes an electromagnetic coil 88 disposed therein. A magnetic end piece 90 is disposed within the cylindrical cavity 86 and is located at one end of the coil 88. The end piece 90 includes a cone-shaped notch 92 which mates with a cone-shaped projection 94 on one end of the valve shaft or armature member 84. Energization of the coil 88 establishes a flux path 95 which sequentially passes through the armature 84, the end piece 90, around the shaft 22 and back to the armature 84 through the center of coil 88. The energization of the coil 88 and the establishment of the flux field 95 causes the armature or valve shaft 84 to move to the right as viewed in the Figures to thereby space apart the valve member 82 from the valve opening 81 and provide for fluid flow from the reservoir 70 to the operating chamber 18. The flux path established by the present construction crosses air gaps as it passes from the coil, through the armature and end piece and to the valve shaft 84. The air gaps are the air gaps 96 disposed between the shaft 22 and the armature member 84 and the air gaps 98 disposed between the cone-shaped portion of the armature 94 and the cone-shaped indentation 92 disposed in the end piece 90. The air gaps 96 and 98 are small in order to maximize the magnetic capabilities of the flux circuit. This allows the armature member 84 to move in response to energization of the coil 88 with relatively low power consumption which represents a great improvement over known prior art wherein the flux path passed through much larger air gaps and a complete magnetic circuit through magnetic material was not provided.

The coil 88 includes leads 100 which serve to effect energization of coil 88. The leads 100 are connected through a slip ring assembly, not shown, to a suitable source of power such as a vehicle battery 102 and a switch 104. The switch 104 is preferably a temperature sensitive switch which senses the actual temperature of the water in the radiator of the vehicle. When the water temperature reaches a predetermined temperature, the switch 104 will close thereby applying the power from the battery 102 across the coil 88 to effect energization of the coil and movement of the valve shaft 84 and valve member 82. The temperature sensitive switch 104 allows the viscous fan drive 10 to be directly sensitive to the temperature of the water in the radiator of the vehicle rather than sensitive to the temperature of the air which passes over the radiator of the vehicle. This allows the viscous fan drive to respond faster and more accurately to the temperature of the water in the radiator of the vehicle. While in the preferred embodiment the switch 104 is sensitive to the temperature of water in the radiator of a vehicle, it should be appreciated that the switch 104 could sense other variables to effect energization of coil 88, and the sensing of other variables are contemplated as coming within the scope of the present invention. For example, switch 104 could sense pressure or temperature such as the head pressure in an air conditioning compressor, or oil temperature, or even underhood temperature to control actuation of the coil 88.

While the coil 88 has been described as being continuously energized upon closing of switch 104, it should be appreciated that the energization of the coil could be pulse width modulated in response to a temperature sensing element sensing the temperature of the water in the radiator. In this manner, proportional rather than on-off control of the coil 88 and valve member 82 can be provided. Pulse width modulation of coil 88 will allow the coil 88 to be energized with a duty cycle proportional to the temperature of water in the radiator of a vehicle as sensed by the temperature sensitive switch 104.

While the coil 88 has been illustrated as being disposed in the cavity 86 in the hub 22 of the viscous fan drive, it should be apparent that the coil 88 could be located elsewhere. For example, the coil could be located on the water pump shaft or on the engine block to which the water pump mounts. However, it is important that one end of the valve shaft member 84 or armature be located centrally within the coil 88 and that magnetic material be provided to establish the flux path 95 around the coil and through the armature 84.

From the foregoing it should be apparent that a new and improved cooling system for an internal combustion engine has been provided. The cooling system includes a fan, a viscous fluid clutch and a water pump. The viscous fluid clutch is preferably responsive to a remote sensor which directly senses the water temperature in the radiator of the vehicle and includes an axially extending shaft disposed on the axis of rotation, a first member which is secured to the shaft for rotation therewith, a second member which is rotatably disposed on the shaft relative to the first member, shear surfaces disposed on the first and second members and forming an operating chamber therebetween, a fluid storage chamber disposed adjacent to the operating chamber, valve means effecting selective communication between the storage chamber and the operating chamber and including a valve member having a first and second position, one of the positions providing for fluid communication between the storage chamber and the operating chamber and the other of the positions blocking such fluid communication, fluid means disposed within the storage chamber and being selectively displaceable into the operating chamber when the valve member is in the one position and pump means in the operating chamber to displace fluid means from the operating chamber to the storage chamber. The cooling system includes an electromagnetic coil having an axial opening therein defined by an inner surface of the coil and an armature member having an outer surface located at least partially within the axial opening with the outer surface of the armature member being disposed contiguous to the inner surface of the coil. The armature member is movable in an axial direction upon energization of the coil and is operably connected to the valve member to effect movement of the valve member between the first and second positions in response to energization of the coil. In the preferred embodiment of the invention the coil is located within a cavity disposed in the shaft of the viscous fluid clutch.

What I claim is:

1. A viscous fluid clutch rotatable about an axis of rotation and adapted to be controlled by a sensing element spaced apart from the fluid clutch comprising an axially extending shaft disposed on the axis of rotation, a first member secured to said shaft for rotation therewith, a second member rotatable relative to said first member, shear surfaces disposed on said first and second members and forming an operating chamber therebetween, a fluid storage chamber disposed adjacent to said operating chamber, valve means effecting selective communication between said storage chamber and said operating chamber and including a valve member having a first and a second position, one of said positions providing for fluid communication between said storage chamber and said operating chamber and the other of said positions blocking such fluid communication, fluid means disposed within said storage chamber and being selectively displaced into said operating chamber when said valve member is in said one position to provide in said operating chamber a medium to transmit rotational motion from one of said members to the other of said members, pump means in said operating chamber to displace said fluid means from said operating chamber to said storage chamber, an electromagnetic coil having an axial opening therein defined by an inner surface of said coil, and an armature member having an outer surface located at least partially within said axial opening of said coil with said outer surface of said armature member being disposed contiguous to said inner surface of said coil, said armature member being movable in an axial direction upon energization of said coil, said armature member being operatively connected to said valve member to effect movement of said valve member between said first and second positions in response to energization of said coil, said coil being operable to establish a flux path to move said armature in an axial direction and wherein said flux path sequentially passes from said coil to said armature and back to said coil without passing through a substantial portion of said shaft, said shaft including an axially extending opening therein disposed coaxial to said axis of rotation and said armature member being located in said axially extending opening in said shaft, and said shaft further including a cavity disposed therein coaxial to said axis of rotation, said coil being disposed in said cavity with said axial opening in said coil being disposed coaxial to said axis of rotation.

2. A viscous fluid clutch as defined in claim 1 further including an end piece formed from a magnetizable material disposed at least partially within said axial opening in said coil and wherein said coil when energized establishes a flux path which sequentially passes from said coil, through said armature member, through said end piece, through a portion of said shaft and back to said coil to effect movement of said armature member in an axial direction.

3. A viscous fluid clutch as defined in claim 1 wherein said sensing element is adapted to be responsive to the temperature of water in a radiator of a vehicle to thereby control the energization of said coil directly in response to the temperature of water in the radiator of the vehicle.

4. A viscous fluid clutch as defined in claim 3 wherein said sensing element establishes a signal proportional to the temperature of water in the radiator of a vehicle and effects energization of said coil proportional to the temperature of water sensed by said sensing element.

5. A viscous fluid clutch as defined in claim 3 wherein said sensing element effects pulse width modulated energization of said coil wherein the duty cycle of the coil when pulse width modulated is proportional to the temperature sensed by said sensing element.

6. A viscous fluid clutch rotatable about an axis of rotation and adapted to be controlled by a sensing element spaced apart from the fluid clutch comprising an axially extending shaft disposed on the axis of rotation, a first member secured to said shaft for rotation therewith, a second member rotatably disposed on said shaft relative to said first member, shear surfaces disposed on said first and second members and forming an operating chamber therebetween, a fluid storage chamber disposed adjacent to said operating chamber, valve means effecting selective communication between said storage chamber and said operating chamber including a valve member having a first and a second position, one of said positions providing for fluid communication between said storage chamber and said operating chamber and the other of said positions blocking said fluid communication, fluid means disposed within said storage chamber and being selectively displaced into said operating chamber when said valve member is in said one position to provide in said operating chamber a medium to transmit rotational movement from one of said members to the other of said members, pump means in said operating chamber to displace said fluid means from said operating chamber to said storage chamber, said shaft having a cavity therein disposed coaxial to said axis of rotation, an electromagnetic coil disposed in said cavity having an opening therein disposed coaxial to said axis of rotation and defined by an inner surface of said coil, and an elongate armature member disposed coaxial to said axis of rotation and having an outer surface located at least partially within said axial opening, said armature member being movable in an axial direction upon energization of said coil, said coil when energized establishing a flux field which sequentially passes from said coil, through said armature and back to said coil, said armature member being operatively connected to said valve member to effect movement of said valve member between said first and second positions in response to energization of said coil.

7. A viscous fluid clutch as defined in claim 6 wherein said outer surface of said armature member is disposed contiguous to said inner surface of said coil.

8. A viscous fluid clutch as defined in claim 6 wherein said shaft includes an axially extending opening therein disposed coaxial to said axis of rotation and said armature member is located in said axially extending opening in said shaft.

9. A viscous fluid clutch as defined in claim 7 further including an end piece formed from a magnetizable material disposed at least partially within said axial opening in said coil and wherein said coil when energized establishes a flux path which sequentially passes from said coil, through said armature member, through said end piece, through a portion of said shaft and back to said coil effect movement of said armature member in an axial direction.

10. A viscous fluid clutch as defined in claim 7 wherein said sensing element is adapted to be responsive to the temperature of water in a radiator of a vehicle to hereby control the energization of said coil directly in response to the temperature of water in the radiator of the vehicle.

11. A viscous fluid clutch as defined in claim 6 wherein said sensing element establishes a signal proportional to the temperature of water in the radiator of a vehicle and effects energization of said coil proportional to the temperature of water sensed by said sensing element.

12. A viscous fluid clutch as defined in claim 11 wherein said sensing element effects pulse width modulated energization of said coil wherein the duty cycle of the coil when pulse width modulated is proportional to the temperature sensed by said sensing element.

13. A cooling system for an internal combustion engine comprising a fan for directing a cooling medium, a viscous fluid clutch for driving said fan and adapted to be controlled by a sensing element spaced apart from the fluid clutch, said fluid clutch including an axially extending shaft adapted to rotate about an axis of rotation, a first member secured to said shaft for rotation, a second member rotatably disposed on said shaft relative to said first member, shear surfaces disposed on said first and second members and forming an operating chamber therebetween, a fluid storage chamber disposed adjacent to said operating chamber, valve means effecting selective communication between said storage chamber and said operating chamber and including a valve member having a first and a second position, one of said positions providing for fluid communication between said storage chamber and said operating chamber and the other of said positions blocking such fluid communication, fluid means disposed within said storage chamber and being selectively displaced into said operating chamber when said valve member is in said one position to provide in said operating chamber a medium to transmit rotational movement from one of said members to the other of said members, and pump means in said operating chamber to displace said fluid means from said operating chamber to said storage chamber, a water pump connected to said viscous fluid clutch for driving said shaft and said first member, said shaft including a cavity located therein coaxial to said axis of rotation, an electromagnetic coil having an axial opening therein defined by an inner surface of said coil, said coil being disposed in said cavity with said axial opening in said coil being disposed coaxial to said axis of rotation, and an armature member having an outer surface located at least partially within said axial opening with said outer surface of said armature member being disposed contiguous to said inner surface of said coil, said armature member being movable in an axial direction upon energization of said coil, said armature member being operatively connected to said valve member to effect movement of said valve member between said first and second positions in response to energization of said coil.

14. A cooling system for an internal combustion engine as defined in claim 13 wherein said shaft further includes an axially extending opening therein disposed coaxial to said axis of rotation and communicating at one end with said cavity and said coil, said armature member being located in said axial extending opening in said shaft and having one end thereof located within said coaxial opening in said coil and the opposite end thereof being operatively connected to said valve member.

15. A viscous fluid clutch as defined in claim 14 wherein said sensing element is adapted to be responsive to the temperature of water in a radiator of a vehicle to thereby control the energization of said coil directly in response to the temperature of water in the radiator of the vehicle.

16. A viscous fluid clutch as defined in claim 15 wherein said sensing element establishes a signal proportional to the temperature of water in the radiator of a vehicle and effects energization of said coil proportional to the temperature of water sensed by said sensing element.

17. A viscous fluid clutch as defined in claim 16 wherein said sensing element effects pulse width modulated energization of said coil wherein the duty cycle of the coil when pulse width modulated is proportional to the temperature sensed by said sensing element.

* * * * *